A. WEMPLE.
Harvester-Rakes.

No. 146,732.  Patented Jan. 20, 1874.

Witnesses.
A. F. Cornell.
G. A. Bacheller

Inventor.
Andrew Wemple,
Per Burridge & Co
Attys.

UNITED STATES PATENT OFFICE.

ANDREW WEMPLE, OF CHICAGO, ILLINOIS, ASSIGNOR OF ONE-HALF HIS RIGHT TO CHARLES COLAHAN, OF SAME PLACE.

IMPROVEMENT IN HARVESTER-RAKES.

Specification forming part of Letters Patent No. 146,732, dated January 20, 1874; application filed November 24, 1873.

*To all whom it may concern:*

Be it known that I, ANDREW WEMPLE, of Chicago, in the county of Cook and State of Illinois, have invented a certain new and Improved Raking Attachment for Harvester; and I do hereby declare that the following is a full, clear, and complete description thereof, reference being had to the accompanying drawings making part of the same.

Figure 1:
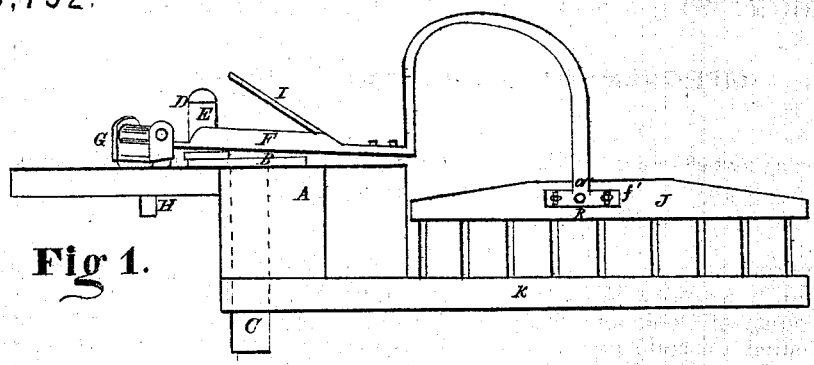
Figure 2:
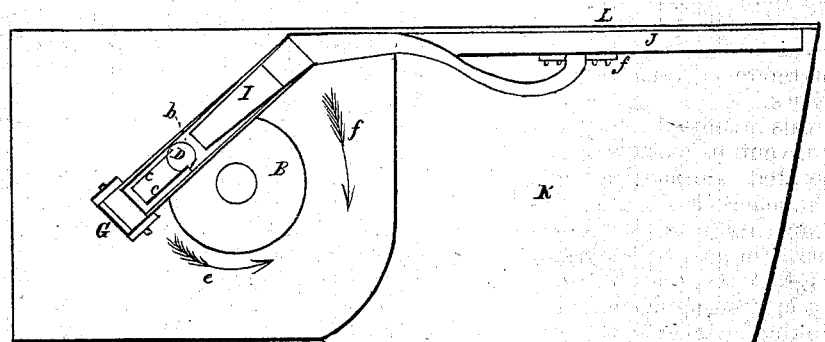

Figure 1 is a side elevation of the machine and raking attachment. Fig. 2 is a plan view. The other views are detached sections, to which reference will be had.

Like letters of reference refer to like parts in the several views.

The nature of this invention relates to a harvester; and the invention consists of a raking attachment operated automatically by the mechanism of the machine, for the purpose of removing the grain from the platform to the rear of the machine in gavels for binding.

Figure 4:
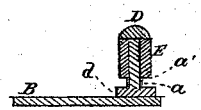

In the drawings, A is intended to indicate the position of a harvesting-machine in its relation to the raking attachment, and which machine is or may be the kind in ordinary use. To said machine is secured a crank, B, by means of a pin, C, on which it revolves by being put in connection with the mechanism of the machine. On the pin D of the crank is a friction-roller, E. A detached view of such roller and pin is shown in Fig. 4, in which it will be seen that the lower end of the roller is reduced in size, forming a neck, *a*, and shoulder *a'*, the purpose of which will presently be shown. F is an arm, one end of which is hinged in a stay, G, whereby it is permitted a vertical movement for lifting the rake, as will hereinafter be described. The stay G referred to is attached to the machine by a stem, H, fitted loosely therein, so that the stay may have a rotative movement. I is an inclined plane secured to the arm F. Said inclined plane reaches upward to the top of the crank-pin, as shown in Fig. 1, and with which it engages for lifting the rake J. The pin D of the crank passes through the arm F in a slot, *b*, Fig. 2. It will be observed that said slot is not of a uniform width, it being wider toward the outer end, whereas near the stay it is suddenly narrowed up by shoulders *c*, Fig. 2, to receive the neck *a* of the roller of the crank-pin between the washer *d* and the shoulder of said roller, for a purpose hereinafter described. To the arm F is attached the rake J, as shown in Fig. 1. K, Fig. 1, is the grain board or platform upon which the cut grain falls, and from which it is swept off by the rake to the rear of the machine.

Figure 3:
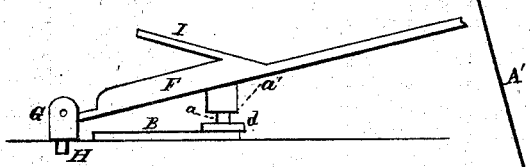

The practical operation of the above-described raking attachment is as follows: The position of the rake, as shown in Fig. 1, is such as when it is about to rake off the grain, and, therefore, stands parallel with the front edge L of the platform directly in rear of the cutter-bar. As the crank B is made to revolve in direction of the arrow *e*, in consequence of its connection with the mechanism of the machine, the crank-pin D carries the arm F and rake around in the opposite direction, as indicated by the arrow *f*, thereby raking the grain over the platform to the edge A', from which it falls to the ground. By the time that the rake has reached the edge A' of the platform, the crank-pin begins to move along outwardly in the slot of the arm and under the inclined plane. The upper end of the pin, in its contact with the under side of the inclined plane, lifts upward the arm F, thereby elevating the rake above the platform, as shown in Fig. 3, in which position it is carried again to the front edge L of the platform by the continued rotation of the crank, and the pin held in the slotted arm, and there dropped to its first position, shown in Fig. 1, by the receding of the pin from under the inclined plane. From this position of the rake, it is again drawn to the rear of the platform by the continued rotation of the crank and pin, as before mentioned, and for the purpose specified. The rake is prevented from lifting from the platform, while in the act of raking off the grain, by means of the neck and shoulder of the friction-roller, above referred to, on the crank-pin, which, as the pin moves back in the slot, the neck enters the narrow section of the slot, the shoulders *c* of the slot pass under the shoulder *a'* of the pin, thereby preventing the arm from lifting up, also the elevation of the rake attached thereto, until the outward movement of the pin carries it out from the narrow section of the slot, which occurs at the proper time for the elevation of the rake, to be returned to the front of the platform.

I do not confine myself to the plan of attaching the inclined plane for lifting the rake to the slotted arm, as the same result can be accomplished by placing the inclined plane, or a modification of it, on the machine, and so arranging it that the slotted arm will slide over it, and thereby lift the arm and thus elevate the rake.

The attachment of the rake to the arm F is by means of a joint, R. Said joint consists of an angle-iron, $f'$, pivoted at $a''$ to the rake. The arms of the angle-iron have slots therein, in which the bolts are inserted for securing the iron to the rake. Said bolts are not screwed up tight; hence they are free to slide in the slots, as the rake may rock on the pivot $a''$. The purpose of this loose connection of the rake to the arm F is to permit it to adjust itself to the vibration of the platform, which is loosely connected to the machine, and hence is subjected to more or less vibration on passing over the ground.

I claim—

1. On the crank-pin D, a roller, E, having a neck, $a$, forming thereon a shoulder, $a'$, for holding down the slotted arm F by its combination with one or more shoulders or flanges, $c\,c$, of the arm, substantially in the manner as described, and for the purpose specified.

2. The combination of the slotted arm F, shoulders or flanges $c\,c$, pivoted stay G, crank-pin D, shoulder $a'$, inclined plane or arm I, and rake J, in the manner as described, and for the purpose set forth.

ANDREW WEMPLE.

Witnesses:
W. H. BURRIDGE,
A. F. CORNELL.